3,431,770
ANALYZER FOR DETERMINING HYDROGEN-
TO-CARBON RATIO IN A MATERIAL
Richard A. Sanford and Buell O. Ayers, Bartlesville, Okla.,
assignors to Phillips Petroleum Company, a corporation
of Delaware
Filed Apr. 5, 1965, Ser. No. 445,642
U.S. Cl. 73—23   3 Claims
Int. Cl. G01h 31/00

ABSTRACT OF THE DISCLOSURE

The hydrogen and carbon content of a material is determined by utilizing two separate oscillator circuits each associated with a separate piezoelectric crystal, each crystal carrying a material which is preferentially sorptive either for water or for carbon dioxide.

---

This invention relates to a method and apparatus for analyzing certain constituents in a material. In one aspect, this invention relates to the determination of the hydrogen and carbon content and/or hydrogen-to-carbon ratio in a material.

Heretofore in the analysis of the materials which contained, at least in part, hydrogen-containing, carbon-containing and/or hydrogen and carbon-containing components, the material was burned and the combustion products were analyzed by a series of chromatographic columns, each column having a different partitioning material capable of separating from the combustion products a single combustion product for detection by that chromatographic column. For example, one column would have a partitioning material which separated water from the other combustion products while another separate chromatographic column would contain a partitioning material which separated carbon dioxide from the other combustion products and so on. The use of a series of chromatographic columns is not only quite expensive but also is quite cumbersome and therefore limited in its scope of utilization.

It has now been found that a simple, compact and efficient method of determining the hydrogen and carbon content and/or ratio of a material can be effected by utilizing two separate oscillator circuits each associated with a separate piezoelectric crystal and each crystal carrying a material which is preferentially sorptive either for water or for carbon dioxide. The change in frequency of oscillation of each crystal caused by the amount of water or carbon dioxide, as the case may be, which is preferentially absorbed by that crystal is then passed through conventional frequency mixing and frequency-to-voltage converter circuits and the representative voltage output recorded. Thus, two separate voltages, i.e., one for water and one for carbon dioxide, are recorded and since these voltages are proportional to the amount of water and carbon dioxide preferentially absorbed by each crystal their ratio will, in effect, give the hydrogen-to-carbon ratio of the material analyzed. If the hydrogen and carbon-containing components of the material to be analyzed are not already in the form of carbon dioxide and water they must be so converted, for example, by combustion thereof, before practicing the method of this invention.

Accordingly, it is an object of this invention to provide a new and improved method and apparatus for analyzing a material. It is another object of this invention to provide a new and improved method and apparatus for determining the hydrogen and carbon content of a material. It is yet another object of this invention to provide a new and improved apparatus for determining the hydrogen-to-carbon ratio of a material.

Other aspects, objects, and the several advantages of the invention will be apparent to those skilled in the art from the description, the drawing, and the appended claims.

Figure 1:
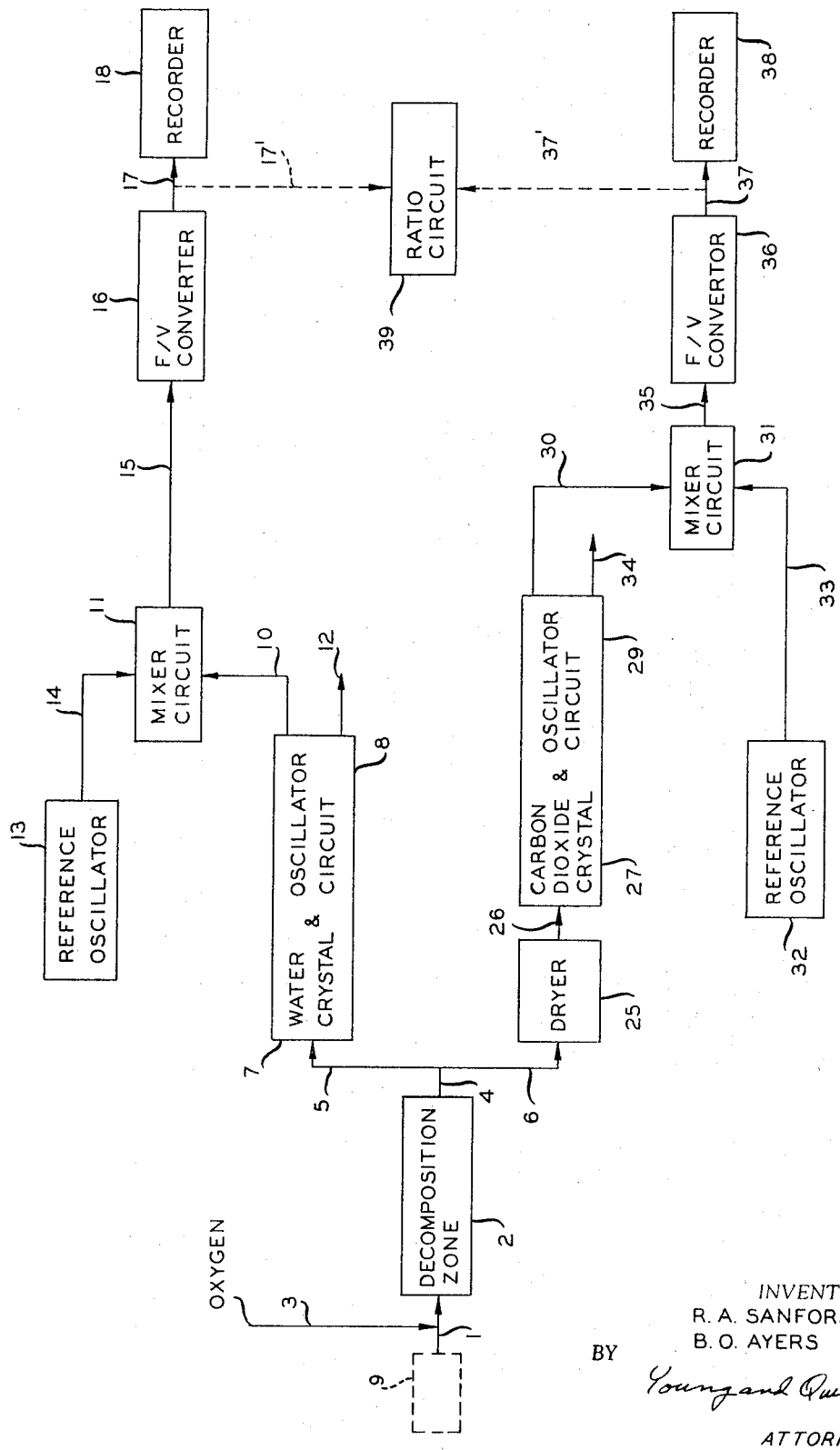
FIGURE 1 is a schematic representation of a system embodying this invention.

Referring to FIGURE 1, there is shown a stream of material 1 entering decomposition zone 2 in which the hydrogen- and carbon-containing components of the material are formed into water and carbon dioxide respectively. Decomposition zone 2 can employ any known method for effecting the above conversion. For example, zone 2 can be a combustion tube heated either externally or internally to a temperature above the combustion temperature of the material to be analyzed. Various combustion catalysts can be employed in decomposition zone 2 such as silver, platinum, copper oxide and lead chromate, lead peroxide, and the like. In order to ensure quantitative conversion of the material in 1 to water and carbon dioxide an excess of oxygen should be present in zone 2 and can be added by line 3. If the material in 1 is a gas stream, the effluent from a chromatographic column 9, decomposition zone 2 should have a cross-sectional area sufficiently restricted so as not to disturb the chromatographic peak separation effected in the column.

The effluent from decomposition zone 2 passes through 4 and is then split into two parts in lines 5 and 6, hereinafter referred to as part 5 and part 6. Part 5 passes into contact with a piezoelectric crystal 7 which carries a material which is preferentially sorptive for water and which has a normal, nonabsorbing oscillating frequency set by it and its associated oscillator circuit 8. When the preferential sorptive material on crystal 7 absorbs water from part 5 it reduces its frequency of oscillation and the reduced frequency is passed from oscillator circuit 8 by conduit 10 to mixer circuit 11. Part 5 leaves crystal 7 and oscillator circuit 8 by vent 12. When the water absorbed by the material carried by crystal 7 is no longer present in part 5, the water previously absorbed is desorbed and removed through vent 12 and the material readied to absorb water again.

The reference oscillator 13 produces a fixed frequency which is fed by conduit 14 to mixer circuit 11 and therein beat against the output frequency from oscillator 8 to produce a difference frequency which is then fed by conduit 15 to frequency-to-voltage converter 16 and then by conduit 17 to recorder 18. It should be noted that the difference frequency can be recorded or counted directly without going through a digital to analog conversion if digital equipment is used. The difference frequency can also be employed as a computer input or an input to a tape recorder and recorded on tape.

The mixer circuit, frequency-to-voltage circuit and recorder can be of any known and conventional apparatus. A preferred mixer circuit is one which beats the frequency output of oscillator 8 against a fixed reference frequency as described above but the invention is not limited thereto. The frequency-to-voltage converter can also be any conventional apparatus which converts the output frequency of, for example, mixer circuit 11 to a voltage representative of that frequency. This representative voltage is then manifested along with its variances on conventional recording means. For example, when stream 1 is from a chromatographic column the voltages are manifested in the form of peaks of varying height and slope on a graph or similar recording means.

Part 6 is passed to dryer 25 which can be any conventional dehydration operation. For example, dryer 25 can contain a desiccant such as calcium chloride, calcium sulfate and the like, the requirement of dryer 25 being that it substantially completely dehydrate part 6. Dryer 25 need not employ a desiccant but rather can use any form of dehydration such as heating or decomposition of the water by commercially available electrolytic water detectors to hydrogen and oxygen.

Dehydrated part 6 then passes by 26 to a crystal 27 which carries a material which is preferentially sorptive to carbon dioxide and which has a normal, nonabsorbing oscillating frequency set by it and its oscillator circuit 29. When the preferential sorptive material on crystal 27 absorbs carbon dioxide from part 6 it reduces its frequency of oscillation and the reduced frequency is passed from oscillator circuit 29 by conduit 30 to mixer circuit 31. Part 6 leaves oscillator 29 by vent 34. Crystal 27 also desorbs absorbed carbon dioxide when part 6 is devoid of same.

A fixed frequency from reference oscillator 32 is passed to mixer circuit 31 by conduit 33 and is therein beat against the output frequency from oscillator 29 to form a difference frequency in the manner described with reference to mixer circuit 11. The difference frequency is then passed by 35 to frequency-to-voltage converter 36 wherein it is converted to a voltage representative of that frequency and the voltage passed by conduit 37 to recorder 38. Here also the difference frequency can be recorded or counted directly if digital equipment is used.

The ratio of the voltages recorded on recorders 18 and 38 respectively will give the hydrogen-to-carbon ratio of the material in line 1. If it is desired to obtain the hydrogen-to-carbon ratio directly the voltages from frequency-to-voltage converters 16 and 33 can be passed by conduits 17′ and 37′ respectively to ratio circuit 39 which combines the two voltages and manifests a combination in terms of a ratio. Ratio circuit 39 can be any known and conventional ratio circuit employed by those skilled in the art at present to obtain direct ratio readings.

Figure 2:
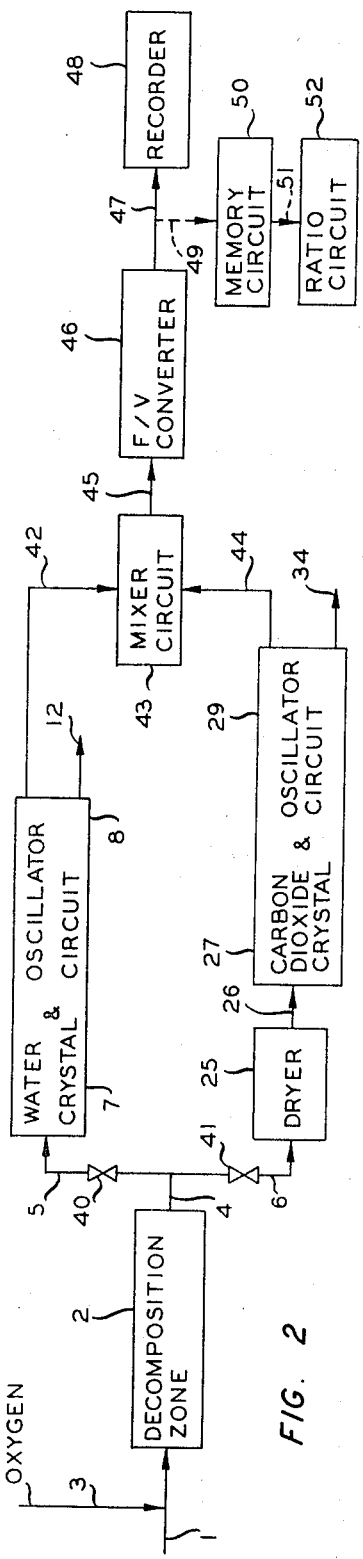
FIGURE 2 is a schematic representation of another system embodying this invention.

In FIGURE 2 material to be analyzed is passed through 1 to decomposition zone 2 along with additional oxygen from 3. The decomposition products in 4 can be split into parts 5 and 6 the flow of each of which is controlled by valves 40 and 41 respectively. When valve 40 is open valve 41 is closed and all of the decomposition products in 4 pass through 5 to water crystal 7 wherein water is absorbed by the material carried by the crystal and the frequency of oscillation of the crystal is reduced. The output frequency of oscillator circuit 8 passes by conduit 42 to mixer circuit 43. Since valve 41 is closed there is no flow of decomposition products through dryer 25, conduit 26 and carbon dioxide crystal 27. Thus, the frequency output of oscillator circuit 29 through conduit 44 to mixer circuit 43 is the normal, nonabsorbing frequency of oscillation of carbon dioxide crystal 27. Thus, the difference frequency from oscillator circuit 8 is beat against the normal, nonabsorbing frequency from oscillator 29 in mixed circuit 43. Thus, the normal, nonabsorbing frequency from oscillator 29 is utilized at the reference oscillator 13 in FIGURE 1 when water crystal 7 is absorbing water from the decomposition stream in 4.

Similarly, when valve 41 is open and valve 40 closed carbon dioxide crystal 27 will absorb carbon dioxide from the dehydrated decomposition products from dryer 25 and the output frequency of the reduced frequency of oscillation of carbon dioxide crystal 26 will be beat in mixer circuits 43 against the normal, nonabsorbing frequency output of water crystal 7. Thus, in effect, water crystal 7 and oscillator circuit 8 are utilized as reference oscillator 32 in FIGURE 1 when carbon dioxide crystal 27 is absorbing carbon dioxide from the decomposition products in 4. The difference frequency output of mixer circuit 43 is then fed by conduit 45 to frequency-to-voltage converter 46 and the voltage representative of that frequency is fed by conduit 47 to recorder 48. Recorder 48 will first record the voltage proportional to the amount of water absorbed by water crystal 7 and then record the amount of carbon dioxide absorbed by carbon dioxide crystal 27 and the ratio of these two recordings will give the hydrogen-to-carbon ratio of the material in line 1.

It should be noted that it can be necessary to purge a crystal of sorbed material with a purge stream such as dry oxygen and the like, after the flow of material to be analyzed over that crystal has been terminated and before the crystal will return to its normal nonabsorbing frequency of oscillation. Purging can be effected, for example, by passing the purge gas into line 5 (from a conduit not shown) after valve 40 has been closed. A fluid which is inert to the crystals, coatings and other apparatus and which will remove absorbed material such as water from the crystal coating can be employed as a purging agent.

If a direct reading of hydrogen-to-carbon ratio is desired the voltage output of frequency-to-voltage converter 46 can be passed by 49 to memory circuit 50 which remembers and holds the voltage output of converter 46 for the time when water crystal 7 is absorbing water. Then after memory circuit 50 receives the voltage output of converter 46 for the time when carbon dioxide crystal 27 is absorbing carbon dioxide it feeds the two voltages by conduit 51 to ratio circuit 52 which then compares the two voltages and produces a direct hydrogen-to-carbon ratio reading. Memory circuit 50 can be of any known and conventional apparatus. Ratio circuit 52 can be the same as ratio circuit 38 of FIGURE 1.

More specifically, if water crystal 7 in oscillator circuit 8 is normally oscillating when not absorbing water at a frequency of, for example, 1000 cycles per second, it will after contact with stream 4 reduce its frequency of oscillation due to the absorption of water to, for example, 500 cycles per second. The reduced frequency of oscillation of 500 cycles per second is then passed from oscillator circuit 8 into mixer circuit 43. At the same time, since valve 41 is closed and no part of stream 4 is contacting carbon dioxide crystal 27, the normal, nonabsorbing oscillation frequency of that crystal, for example, 1500 cycles per second, is passed through oscillator circuit 29 into mixer circuit 43. Thus, the reduced frequency of oscillation of absorbing water crystal 7 is beat against the normal, nonabsorbing oscillation frequency of carbon dioxide crystal 27 in mixer 43 and a difference frequency, 1000 cycles per second in this situation, is passed to frequency-to-voltage converter 46 and therein converted to a representative voltage. This voltage is then passed to recorder 48 and recorded, for example, as a point on a graph. This graph represents the voltage output from converter 46. This voltage is determined by the difference between frequencies beat together in mixer circuit 43 which in turn is caused by the amount of water absorbed by crystal 7. Thus, the frequency of oscillation of crystal 7 while absorbing water will plot a curve on a graph on recorder 48.

Thus, carbon dioxide crystal 27 in oscillator circuit 29 was utilized in the same manner as reference oscillator 13 would be utilized in FIGURE 1. Similarly, when valve 41 is open and valve 40 closed, carbon dioxide crystal 27 will absorb carbon dioxide and its normal, nonabsorbing frequency of oscillation, for example, 1500 cycles per second, will be reduced, for example, to 1300 cycles per second. This reduced frequency is then beat in mixer circuit 43 against the normal, nonabsorbing oscillating frequency of water crystal 7 in oscillator circuit 8, i.e., 1000 cycles per second. The difference frequency produced in mixer circuit 43, in this situation 300 cycles per second, is passed to frequency-to-voltage converter 46 and the voltage so produced recorded. The recorded voltage is representative of the amount of carbon dioxide absorbed by carbon dioxide crystal 27. This technique of recording is most desirable for a recorder set with a base line at midscale so that a curve or plateau will be produced in one direction from the base line for water and in the opposite direction for carbon dioxide. Another technique would be to have both crystals oscillating at the same base frequency so that the curves or plateaus for both water and carbon dioxide would be recorded in the same direction from the recorder's base line.

The embodiment of the invention represented by FIGURE 2 can be used with a continuously flowing stream or a periodically flowing stream in 1 without the use of or need for valves 40 and 41. When employed in this manner a change in the hydrogen-to-carbon ratio of the stream in 1 would be indicated by a change in the output frequencies of both crystals and therefore the mixer circuit. This system can be used to indicate variations in composition from the control point of the process.

It should be noted that the numerical frequency values used above were picked only for ease of explanation and are not intended to represent realistic values of crystal oscillation.

Figure 3:
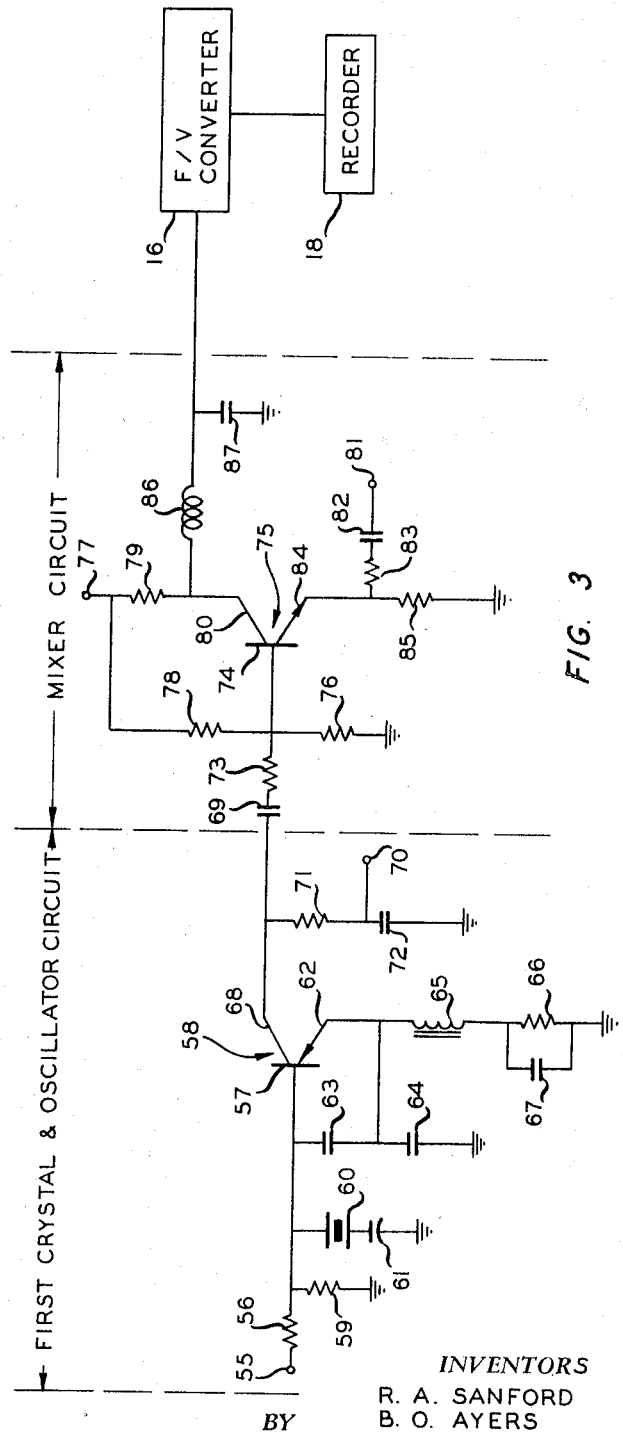
FIGURE 3 is a schematic circuit drawing of a crystal circuit, oscillator circuit and mixer circuit.

In FIGURE 3 one of the many possible and known circuits is shown for carrying out the steps of detecting a component and passing the change in frequency of oscillation of the crystal from an oscillator circuit to a mixer circuit wherein the change is beat against a frequency from a separate oscillator circuit and the difference frequency produced is passed through frequency-to-voltage converter and the voltage recorded. The first crystal and oscillator circuit is provided with a potential connected to 55 which is connected through resistor 56 to base 57 of transistor 58 and through resistor 59 to the ground. Piezoelectric crystal 60 which carries the preferentially sorptive material is connected to base 57 of transistor 58 and through capacitor 61 to the ground. Emitter 62 of transistor 58 is connected through capacitor 63 to base 57 of transistor 58 and through capacitor 64 to the ground. Also, emitter 62 is connected through coil 65 and through resistor 66 which is shunted by capacitor 67 to the ground. Collector 68 of transistor 58 which carries the output frequency of the change of the frequency of oscillation of crystal 60 when that crystal is preferentially absorbing water or carbon dioxide passes that frequency through capacitor 69 into the mixer circuit. Collector 68 is also connected to a potential 70 through resistor 71 and through by-pass capacitor 72 to the ground.

The output frequency from the oscillator circuit passes through resistor 73 to base 74 of transistor 75. The input frequency signal is also connected through resistor 76 to the ground. A source of potential 77 is connected through resistor 78 to the base 74 of transistor 75 and also through resistor 79 to collector 80 of transistor 75. Input terminal 81 carries an output frequency from a second crystal and its associated oscillator circuit or from a separate reference oscillator circuit both of which can have circuits similar to the first crystal and oscillator circuit shown. This second crystal and oscillator circuit can, for example, be carbon dioxide sensitive crystal 27 in oscillator circuit 29 of FIGURE 2. In that case the first crystal and oscillator circuit shown in FIGURE 3 will be water sensitive crystal 7 and oscillator circuit 8 of FIGURE 2. Similarly, the reference oscillator can be either reference oscillator 13 or 32 of FIGURE 1 in which case the first crystal and oscillator circuit shown in FIGURE 3 will be both water sensitive crystal 7 and oscillator circuit 8 or both carbon dioxide sensitive crystal 27 and oscillator circuit 29 respectively.

The frequency from the separate oscillator circuit passes through capacitor 82 and resistor 83 to emitter 84 of transistor 75. Emitter 84 is also connected through resistor 85 to the ground. Thus, the frequency passing into the mixer circuit from 81 passes to emitter 84 of transistor 75 and is beat against the frequency from the oscillator circuit shown passing to base 74 of transistor 75 thereby producing a difference frequency which travels from collector 80 of transistor 75 through coil 86 to frequency-to-voltage converter 16 and from there, after being converted to a representative voltage, to recorder 18. The difference frequency signal lead is also grounded through capacitor 87.

Generally, this invention is applicable to the analysis of any material which contains both hydrogen, carbon, and hydrogen and carbon-containing components which components are or can be formed into carbon dioxide and water. This system is particularly applicable to the determination of hydrogen-to-carbon ratios of a gaseous stream being analyzed in a chromatographic column or similar device.

Generally, this invention can employ any type of piezoelectric crystal such as the well-known quartz type and the like. The sizes, shapes and frequencies of the crystals employed can vary widely but generally the size and shape should be such that the frequency is in the range of from about 500 kilocycles to about 200 megacycles, preferably from about 5 megacycles to about 20 megacycles.

The preferential absorption material can be carried on the crystal in any convenient manner but is preferably carried in the form of a liquid or solid coating. Suitable conventional materials can be employed as the sorption material of this invention and for the detection of water include such materials as silica gel, alumina, natural resins, synthetic polymers, and similar known hygroscopic materials. Suitable materials for the detection of carbon dioxide includes polar molecules such as polyethylene glycol.

It should be noted that the use of a dryer (25) can be omitted from the practice of this invention if the relative sensitivities of the two crystals (7 and 27) for water are first determined so that correction for the effect of water on the carbon dioxide crystal can be made either manually or by automatically computing with conventional analog computation equipment. Such correction is necessary because no material is presently known which will preferentially sorb carbon dioxide from a mixture of same and water. Therefore, the frequency outputs from the crystal oscillator circuits will be representative of water in the case of 8 and water and carbon dioxide in the case of 29.

As an example the water sensitivity of the crystals in 7 and 27 can be determined by passing the same water-carrying gas over both crystals and comparing the voltage output for each crystal. The frequency to voltage converter can then be adjusted so that the voltage output for each crystal is the same when the above water-carrying gas is passed over both crystals. After this adjustment, when the dryer is omitted, the difference between the peak or plateau recorded for the water crystal 7 and the carbon dioxide crystal 27 will represent the carbon dioxide present in the stream to be analyzed. This method applies preferentially to the embodiment shown in FIGURE 1 where two voltages, one from each detector and reference, are available for independent attenuation. The method can also be employed with the embodiment of FIGURE 2 if sequential measurements are obtained by use of valves 40 and 41 and the effect of the water on the carbon dioxide crystal calculated in a known manner. This latter method is necessary with the embodiment of FIGURE 2 because in that case a single voltage output and attenuation is available.

It is generally preferred that the material passing into the decomposition zone be in the vaporous state since the decomposition products should be passed over the water and carbon dioxide absorbing crystals in the vaporous state. However, if adequate vaporization is achieved in the decomposition zone the material passing thereinto need not necessarily be vaporous.

Example

A mixture of n-butane, n-pentane and pentene-1 is injected into a chromatographic column having a carrier gas stream of helium passing therethrough at a rate of 50 to 100 cc. per minute. In all, 0.5 cc. of the mixture is injected into the column which employs squalene absorbent to separate the n-butane, n-pentane and pentene-1 into discrete segments and spread each segment out over an increment of the helium stream. Half of the helium stream is passed over a first piezoelectric quartz crystal oscillating at a frequency of about 9.000 megacycles per second and coated with a liquid coating of a hygroscopic polymer. The other half of the above helium stream is passed over a second piezoelectric quartz crystal oscillating at a frequency of about 9.000 megacycles per second and coated with a liquid coating of polyethylene glycol.

Before the splitting of the above helium stream it is passed through a ceramic tube externally heated by a flame to a temperature of about 650° C. About 20 cc. of oxygen is added to the stream prior to combustion thereof in the ceramic tube to ensure quantitative conversion of the hydrocarbons present to carbon dioxide and water. In the ceramic tube the following oxidation reactions take place:

(1) $C_4H_{10} + 13 \cdot O \rightarrow$
$\qquad 4 \cdot CO_2 + 5 \cdot H_2O$ (H/C ratio of 10/4)
(2) $C_5H_{12} + 16 \cdot O \rightarrow$
$\qquad 5 \cdot CO_2 + 6 \cdot H_2O$ (H/C ratio of 12/5)
(3) $C_5H_{10} + 15 \cdot O \rightarrow$
$\qquad 5 \cdot CO_2 + 5 \cdot H_2O$ (H/C ratio of 2/1)

The first quartz crystal oscillates normally at a frequency of 9.000 megacycles per second and tends to preferentially absorb water from the combustion products of the helium stream. N-butane is the first component to show up in the helium stream from the chromatographic column and thus is the first component oxidized and passed into contact with the first crystal. When absorbing water produced by the oxidation of n-butane the first crystal experiences a reduction in frequency. The second component to be oxidized in the helium stream is n-pentane and when absorbing water therefrom the first crystal experiences a second reduction in the frequency of vibration. The last component to be oxidized in the helium stream is pentene-1 and the first crystal when absorbing water therefrom experiences a third reduction in frequency of vibration. Each of these reduced frequencies of vibration is beat in the mixer circuit against a reference oscillator having a fixed frequency of oscillation of 9.001 megacycles per second to produce three separate difference frequencies.

The other half of the helium stream containing oxidation products of water and carbon dioxide is passed through a dryer containing calcium chloride desiccant and then into contact with the second crystal which is tuned to oscillate normally at a frequency of 9.000 megacycles per second and which preferentially absorbs carbon dioxide. The second crystal when absorbing carbon dioxide from the oxidation of n-butane experiences a first reduction of frequency. The second crystal when absorbing water from the oxidation of n-pentane experiences a second reduction in frequency of oscillation. The second crystal when absorbing water from the oxidation of pentene-1 experiences a third reduction in oscillation. These reductions in frequency of oscillation are separately beat against a fixed reference oscillator frequency of 9.001 megacycles per second to produce three separate difference frequencies.

The three difference frequencies for the first crystal are converted to representative voltages and graphically recorded in the form of three peaks each of which has an area thereunder representative of the magnitude of the difference frequencies and therefore the amount of water present. Similarly, the three difference frequencies for the second crystal after being converted to representative voltages are also graphically recorded in the form of three peaks each having an area thereunder representative of the magnitude of those three difference frequencies and therefore the amount of carbon dioxide present.

When the area of the peak for n-butane from the first crystal is divided by the area under the peak for n-butane from the second crystal, a ratio of about 2.5/1 is obtained which corresponds to the hydrogen-to-carbon ratio of 10/4 above. Similarly, with the peaks from both crystals for n-pentane a ratio of 2.4/1 is obtained which corresponds with the ratio of 12/5 above. Finally, when the peaks of both recordings for pentene-1 are compared the ratio is 2.0/1 which corresponds to 2/1 above.

Thus, by this invention the hydrogen-to-carbon ratios of the three hydrocarbons present in the chromatographic column are determined. Further, qualitative identification of the three hydrocarbon compounds present is also aided since the specific hydrogen-to-carbon ratios obtained can be used to identify the compound from which they were obtained if that compound is unknown.

Reasonable variations and modifications are possible within the scope of this disclosure without departing from the spirit and scope of the invention.

We claim:
1. In apparatus for determining the hydrogen-to-carbon ratio in a substance, means for decomposing the hydrogen and carbon-containing components of said substance into water and carbon dioxide, a first piezoelectric material carrying a material preferentially sorptive for water, conduit means openly connecting said decomposition means and said first piezoelectric material, a first oscillator means operatively connected to said first piezoelectric material, a first mixer circuit operatively connected to said first oscillator means, a first reference oscillator operatively connected to said first mixer circuit, a dehydrator, conduit means openly connecting said decomposition means and said dehydrator, a second piezoelectric material carrying a material preferentially sorptive for carbon dioxide, conduit means openly connecting said dehydrator and said second piezoelectric material, a second oscillator means operatively connected to said second piezoelectric material, a second mixer circuit operatively connected to the output of said second oscillator means, a second reference oscillator operatively connected to said second mixer circuit, separate frequency converter means operatively connected to the output of said first and second mixer circuits, and means for at least one of (1) combining said outputs of said frequency converter to form a single output representative of the hydrogen-to-carbon ratio in said substance, and (2) separately recording the outputs of said frequency converters.

2. The apparatus according to claim 1 wherein said decomposition means is operatively connected to the outlet of a chromatographic analyzer column and said dehydration means is an electrolytic dryer.

3. Apparatus for determining the hydrogen-to-carbon ratio of a substance comprising means for decomposing the hydrogen and carbon-containing components of said substance into water and carbon dioxide, a first piezoelectric material carrying a material preferentially sorptive for water, a valved conduit openly connecting said decomposition means and said piezoelectric material, a first oscillator means operatively connected to said first piezoelectric material, a dehydrator, a valved conduit openly connecting said decomposition means and said dehydrator, a second piezoelectric material carrying a material preferentially sorptive for carbon dioxide, conduit means openly connecting said dehydrator and said second piezoelectric material, a second oscillator means operatively connected to said second piezoelectric material, a mixer circuit operatively connected to the outputs of both said first and said second oscillator means, a frequency converter operatively connected to the output of said mixer circuit, and means operatively connected to the output of said frequency converter to at least one of (1) record the output of said frequency converter and (2) retain the output of said frequency converter and thereafter produce a single output representative of the hydrogen-to-carbon ratio in said substance.

References Cited

UNITED STATES PATENTS

| | | | |
|---|---|---|---|
| 2,025,121 | 12/1935 | Minter | 73—27 |
| 2,756,128 | 7/1956 | Gerrish | 73—27 |
| 3,260,104 | 7/1966 | King | 73—23 |
| 3,327,519 | 6/1967 | Crawford | 73—23 |

RICHARD C. QUEISSER, *Primary Examiner.*

C. I. McCLELLAND, *Assistant Examiner.*

U.S. Cl. X.R.

23—254